United States Patent

MacArthur

[15] 3,662,378

[45] May 9, 1972

[54] ELECTRONIC KEYBOARD INPUT CIRCUIT

[72] Inventor: Guy MacArthur, Highland Park, Ill.

[73] Assignee: Cherry Electrical Products Corporation, Highland Park, Ill.

[22] Filed: June 1, 1970

[21] Appl. No.: 41,798

[52] U.S. Cl. ........................340/347 DD, 178/26 A, 340/365

[51] Int. Cl. ..........................................................G06f 3/02

[58] Field of Search ..................340/347 DD; 178/26 R, 26 A

[56] References Cited

UNITED STATES PATENTS 3,518,660 6/1970 Nicklas ...........................340/347 DD 3,208,046 9/1965 Young............................340/347 DD

*Primary Examiner*—Maynard R. Wilbur

*Assistant Examiner*—Robert F. Gnuse

*Attorney*—Edward C. Threedy

[57] ABSTRACT

A continuously running astable multivibrator (clock) operates on electronic counter for $2^n$ counts, (n) being a variable dependent upon the number of bits in the code being provided. A key closure in a keyboard matrix provides a continuity path between a decoder circuit which senses the least significant bits of the counter, and a multiplexer or multiplexers which sense the most significant bits. The multiplexer provides an output which effectively stops the clock at the desired code, thereby locking the clock out as long as the key is depressed and effectively rejecting multiple key inputs.

3 Claims, 1 Drawing Figure

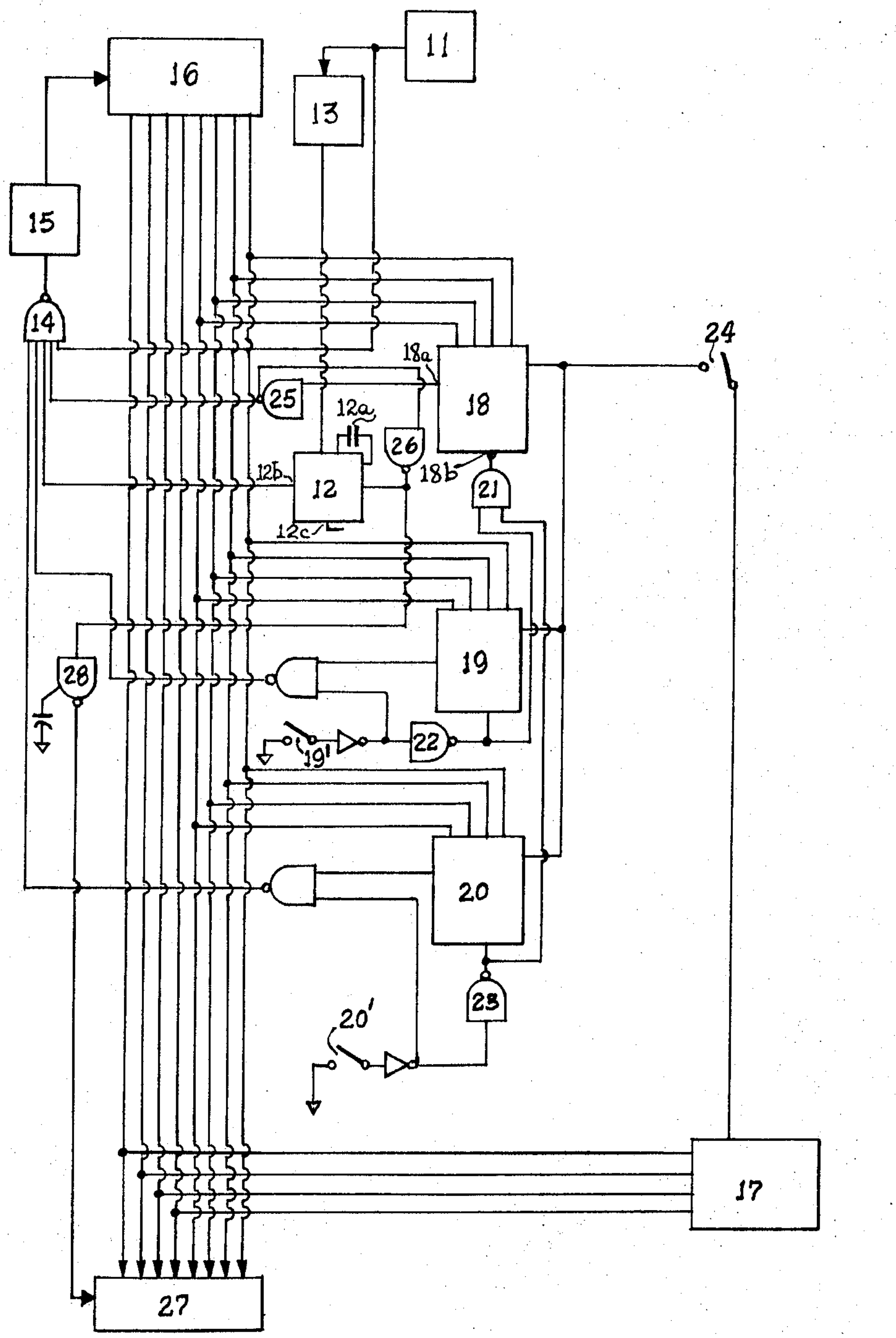
INVENTOR.
GUY MACARTHUR
Edward C. Threedy
HIS ATTORNEY.

ELECTRONIC KEYBOARD INPUT CIRCUIT

SUMMARY OF THE INVENTION

This invention relates to electronic keyboard input systems utilizing mechanical, electromechanical, or solid state switches for input devices in a switch input matrix consisting of a number of rows and columns of switches.

In the normal standard types of keyboards on the market, the switches would be limited to 16 rows and 16 columns which limits the coding capabilities to an eight bit code in binary format.

It is the object of this invention to provide capability for generating a binary coded output from the keyboard that does not have a bit count limitation.

A problem that has been quite prevalent in the keyboard industry in the past has been that of elimination of contact bounce from closures and release of mechanical and electromechanical keys. It is a further object of this invention to provide an improved key entry system where the problem of contact bounce is not a factor in the output from the keyboard.

Another problem in the design of electronic keyboards has been that of detecting multiple key depressions and preventing erroneous data from being generated if two or more keys are depressed simultaneously. Several approaches have been taken to solve this problem, including the use of current sensing analog detection techniques, and digital comparison techniques. It is a further objective of this invention to provide an improved system of multiple input detection.

Still another disadvantage of present state electronics keyboards is the inability or difficulty of generating more than one or two codes per key. In the present state of the art, it is desirable to be able to go from a lower case to an upper case (shift) to a control case (control), and sometimes, to a numeric case from one key. This is accomplished by depressing the basic key which will normally produce the lower case code, and simultaneously depressing the shift or control, or numeric mode keys. A standard method employed in the past, and applicable only to the USASCII code, was to change one or two of the second most significant bits. However, for other codes, such as EBCDIC, this technique could not be followed and the only practical method involved a costly means of encoding two or more complete circuits and effectively inhibiting the outputs of all but the particular mode of operation. Another objective of this invention is to provide an improved means of generating multiple codes from a single key.

Yet another problem inherent to electronic keyboards is the encoding or code generating problem. Most keyboards use a diode encoding or related technique which involves a minimum of two steering diodes per key, and two diode matrices with 16 inputs and four outputs. In addition, it is often necessary to provide means of detecting a key input - say by means of an eight input gate or similar device - and providing a strobe circuit which provides an electrical interlock with the interface equipment. Another objective of this invention is to provide a simplified means of encoding and strobe generation without the use of steering or encoding diodes and complicated gates.

One of the most common complaints of electronic keyboard users is that the majority of keyboard manufacturers have no means of retaining data on line in the event of two key depressing detection. It is common practice to inhibit either the strobe or the bits and strobe when a double key depression is detected. Still another objective of this invention is to provide a means of storing the bits for the first key depressed until it is released, at which time the code of the second will appear without interruption or loss of the output.

The invention also incorporates novel methods of generating a clock frequency, use of components in novel arrangements for stopping the clock at the selected code, inhibiting outputs in unselected modes, in preventing code changes from one mode to another for certain keys such as the space bar, and in gating specific functions.

GENERAL DESCRIPTION

The objects of this invention are achieved through the preferred embodiment shown in the accompanying drawing in which:

The FIGURE is a schematic block design of an electric circuit for keyboard input systems.

In this FIGURE, the clock frequency is generated by an astable multivibrator (11) with a frequency typically of 1 megahertz although a slower or faster clock could be used. The only restraints being that the clock frequency one-half cycle time must exceed the total propagation delay through gates and components required to stop the clock, or cannot be slower than the fastest typing speeds. However, assuming a response time from key closure to clock stoppage of 140 nanoseconds, and a maximum typing speed of one character every 100 milliseconds, the clock frequency can be designed to provide a counter ripple through as follows:

Assuming an 8 bit counter—

$$\text{Min. frequency} = 100 \text{ ms.} = 2^8 \times T \text{ or } 256\ T = 0.1\ F = \frac{1}{T}$$
2500 c.p.s.

$$\text{Max. frequency} = \frac{1}{160 \times 2 \times 10^{-9}}\ 3.12 \text{ megahertz}$$

The output from the clock generator or astable multivibrator (11) is used to generate a two phase clock, one phase of which continuously clocks a one-shot multivibrator (12), and the other to operate a counter. The two phase clock is generated by applying one input to one-half of a dual flip-flop (13), and applying another input to the second half of the dual flip-flop through a four input nand gate (14). The nand gate (14) serves to invert the clock input to the second half of the dual flip-flop (15) so that the outputs of flip-flops (13) and (15) respectively are one-half of the clock frequency and are 90° out of phase with respect to each other. This phase difference is essential in stopping the clock at the desired code.

The output clock from the flip-flop (15) is used to clock a $2^n$ stage binary counter (16). This counter will cycle continuously through $2^n$ counts as long as the clock is allowed to trigger it. The clock in turn will function as long as its input to the gate (14) is the only avenue that changes state. If any other input changes state, the clock is effectively locked out and inhibited and the counter (16) is stopped.

In the example shown, the four least significant bits of the counter (16) are continuously scanned by a 1 of 16 decoder (17). It is important to note that this is an example and not a limitation. For instance, this example is based on a 16 × 16 switch matrix. This matrix could be expanded to a 32 × 32 by adding another 1 of 16 decoder and expanding the counter to a 16 rather than an eight bit. This decoder (17) will produce a low output for each of the binary inputs represented from 0 to 16 decimal equivalent, on one of its 16 output line.

The four most significant bits in the example are continuously scanned by a 16 input multiplexer (18). The multiplexer (18) will provide a positive output on its output line (**18*a*) for a low input on any one of the 16 input lines corresponding to a four bit binary code input from the counter (16), or a low output for any high, providing that the strobe input (18*b***) is low. Again, it is important to point out that the use of 16 input multiplexer only serves as an example, rather than a limitation. For instance, an eight input multiplexer could be used in conjunction with a 1 of 16 decoder to generate a seven bit ASCII code or two 16 input multiplexers could be used in conjunction with two 1 or 16 decoders to generate a 16 bit code.

In the example, three 16 input multiplexers are used, one of which is for a lower case mode (18) and the second (19) for shift mode, and the third (20) for a control mode. Here again, it is important to point out that more could be used, depending on the number of different codes desired per switch. Also it is important to note that as an alternate approach for some codes, such as the USASCII a single multiplexer could be used for lower case, and certain bits could be changed by other types of logic gates such as exclusive OR gates for the shift and control modes. The strobe input (**18*b*) to each multiplexer is controlled by gates (21), (22), and (23). These gates are nand gates and function to provide a low output to the strobe only in an active condition. For instance, in the lower case mode strobe (21), output is low and the outputs of strobe gates (22) and (23) are high. If the shift key (19) is depressed, strobe low, goes high, (22) goes low, and (23) remains high. Conversely, if the control key (20) is depressed, strobe (21) and (22) will be high and (23**) low.

A key switch closure (24) provides a continuity path between the output of the decoder (17) and one of the 16 inputs of the multiplexers (18), (19), or (20). When the counter (16) reaches the binary count represented by the four least significant bits scanned by the decoder (17), and the four most significant bits scanned by the multiplexer, the low output from the decoder will be sensed by the multiplexer and an output will be provided. Assuming that we are in the lower case mode, output (18*a*) of multiplexer (18) goes high. This high causes the output of the multiplexer control gate (25) to go low. This output provides an input to gate (14) and to the one-shot control gate (26). The output of the one-shot control gate goes from a low to a high. This actuates the one-shot multivibrator (12) which puts out a timed pulse on the fall of the clock pulse. The time duration of the pulse depends upon the timing capacitor (12*a*) used, but will nominally be set from 1 to 2 milliseconds.

One output (12*b*) from the one shot multivibrator (12) will be used as a temporary clock inhibit to the clock input gate (14) and will prevent the counter (16) from any additional counts. At the end of the 1 or 2 ms timed pulse from the one-shot multivibrator (12), any effects of contact bounce from the key closure (24) are eliminated and the multiplexer control gate (25) output takes over to inhibit the counter clock. It is important to note here that the one-shot multivibrator (12) and the necessity for a two phase clock can be eliminated if a bounce free key entry device or magneto resistor were to be used.

An important feature of the invention should now be noted. Since the clock is stopped upon a key closure and the counter output reflects the selected code for the key, the depression of other keys has no effect on the output code until the first key is released, which allows the clock to move the counter to the next code sensed.

Output gates (27) on the bit output lines prevent any output to the computer or interface circuitry until a strobe comes on. This prevents undesired ripple or RF cross coupling on the output. The strobe is generated by an output from the one-shot control gate (26) which actuates strobe generator gate (28) through a timing network to generate a delayed strobe. This delayed strobe again will not be necessary when solid state bounceless key entry devices are used.

Another feature of the invention lies in the fact that a pulsing strobe can also be provided by use of the second output (12*c*) from the one-shot multivibrator (12). This strobe could be utilized for repeat function code generation such as underlining, etc.

From the foregoing, it is clear that I have devised an electronic keyboard input circuit by which multiple input detection is achieved and encoded and steered without steering and encoding diodes and gates, wherein the multiple input codes can be generated from a single key without contact bounce and in which coded bits generated from the first key depressed, are stored until released, while successive code bits of other keys will thereafter appear without interruption and loss of output.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. An electronic keyboard input circuit having a continuous code generated by a continuously cycling binary coded decimal counter generating a desired code and having a plurality of outputs including a. a multivibrator having a clocked frequency of 2,500 cycles per second to 3.5 megacycles divided by an inverter and a plurality of flip-flop devices to provide a two-phase clocking, with the phases 90° apart and adapted to detect a code and inhibit a change in said binary counter, b. decoder means for continuously scanning certain of said plurality of outputs of said binary counter to produce a change in each of its output lines for each combination of binary inputs, c. multiplexing devices continuously scanning certain other of said plurality of outputs of said binary counter, d. code switches in the circuit for establishing a continuity path between said multiplexing devices and said decoder means, and e. a gate in said circuit through which clock pulses from said multivibrator pass until one of said code switches is closed, establishing a continued path between said decoder means and said multiplexing devices to cause an input to said gate for inhibiting the clocking pulses to pass into said binary counter.

2. An electronic keyboard input circuit as defined by claim 1 and which includes a one-shot multivibrator having a variable output pulse time to detect an output from said multiplexing devices so as to produce an output pulse to said gate, controlling said means for clocking said counter, and having an output pulse of a variable time delay, providing a pulsed strobe from said one-shot multivibrator to actuate said gate in said counter output lines and another pulsed strobe to be used as a repeating function.

3. An electronic keyboard input circuit as defined by claim 1 wherein multiple codes can be generated from a single code switch means closure through a plurality of multiplexing devices connected in circuit to respond to a specific code when a strobe line is enabled or by a change in the bits scanned by said multiplexing devices and said decoder means through a combination of logic gates and control keys.

* * * * *